United States Patent
Sporhase

(10) Patent No.: US 6,497,142 B1
(45) Date of Patent: Dec. 24, 2002

(54) WIND MEASUREMENT APPARATUS

(76) Inventor: Velene Sporhase, 22502 "A" St., Eagle, NE (US) 68347-1946

( * ) Notice: Subject to any disclaimer, the term of this patent is extended or adjusted under 35 U.S.C. 154(b) by 62 days.

(21) Appl. No.: 09/709,950

(22) Filed: Nov. 10, 2000

Related U.S. Application Data

(60) Provisional application No. 60/167,880, filed on Nov. 29, 1999.

(51) Int. Cl.[7] ............................................... G01W 1/00
(52) U.S. Cl. .................................. 73/170.01; 73/170.05
(58) Field of Search ........................ 73/170.01, 170.05, 73/170.11, 170.07, 170.02

(56) References Cited

U.S. PATENT DOCUMENTS 5,117,690 A * 6/1992 Baer ........................ 73/170.01
5,811,673 A * 9/1998 Kwok et al. ............... 73/170.5

* cited by examiner

*Primary Examiner*—William Oen
*Assistant Examiner*—Andre Allen

(57) ABSTRACT

A wind measurement apparatus includes an upright post with an elongated swing arm pivotally connected to the upper end of the post and freely rotatable on a vertical pivot axis. A fin on the swing arm will direct the swing arm in the direction of the wind. A streamer attached to the rearward end of the swing arm will demonstrate the relative velocity of the wind.

2 Claims, 2 Drawing Sheets

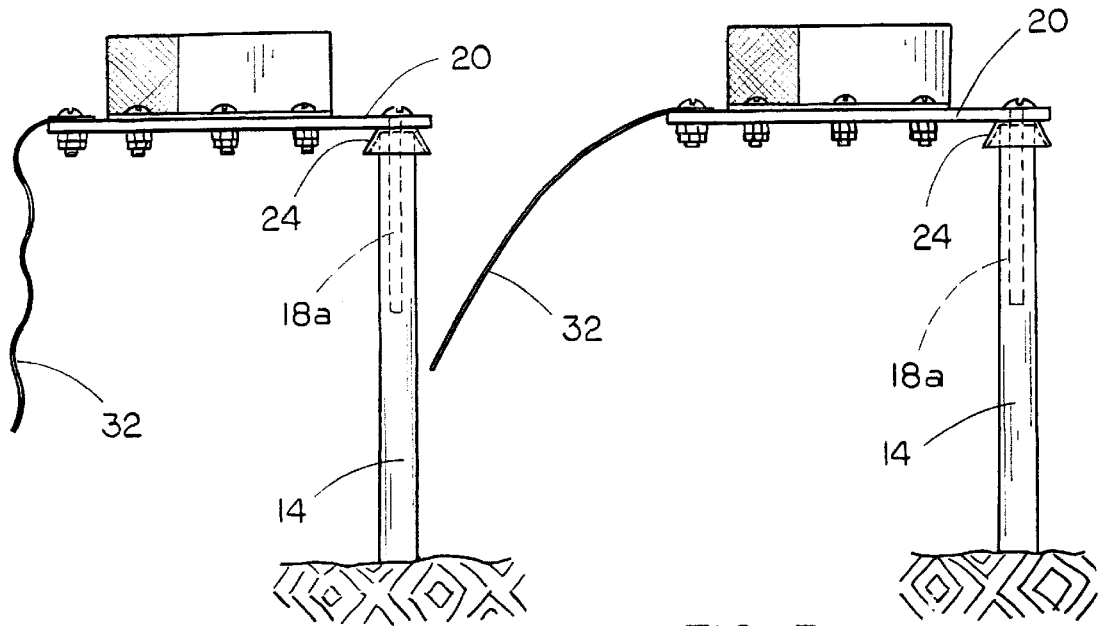
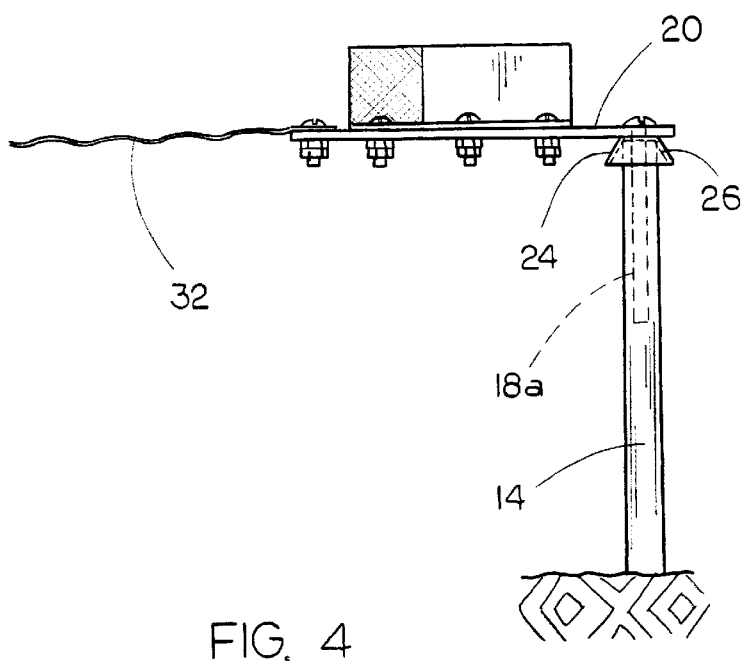
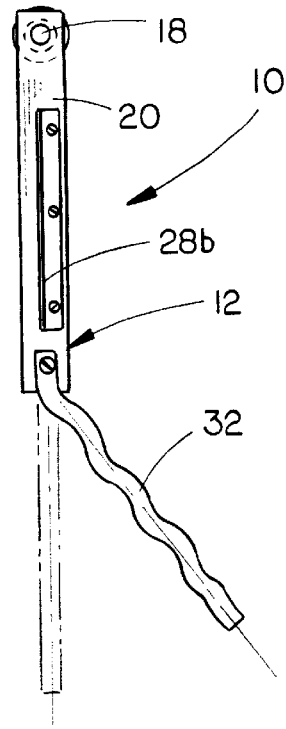

WIND MEASUREMENT APPARATUS

CROSS-REFERENCES TO RELATED APPLICATIONS

This application claims the benefit of U.S. Provisional Application Serial No. 60/167,880, filed Nov. 29, 1999.

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to wind vanes, and more particularly to an improved wind vane which shows both wind direction and approximate wind speed.

(2) Background Information

Various forms of wind measurement apparatus have been known for many years. The early wind vanes typically included a flat upright member sculpted to take the form of an animal or other desired shape, with an arrow which would point the vane in the direction from which the wind was coming.

While such wind vanes were effective in determining the direction of the wind, they were not designed to give an indication of the relative velocity of the wind, or in showing a previous direction of the wind.

BRIEF SUMMARY OF THE INVENTION

It is therefore a general object of the present invention to provide an improved wind measurement apparatus.

Another object of the present invention is to provide an improved wind measurement apparatus which shows both wind direction and relative wind velocity.

A further object is to provide an improved wind measurement apparatus which is capable of showing a prior wind direction.

Still another object is to provide an improved wind measurement apparatus which is economical to manufacture and sturdy in construction.

These and other objects of the present invention will be apparent to those skilled in the art.

The wind measurement apparatus of the present invention includes an upright post with an elongated swing arm pivotally connected to the upper end of the post and freely rotatable on a vertical pivot axis. A fin on the swing arm will direct the swing arm in the direction of the wind. A streamer attached to the rearward end of the swing arm demonstrate the relative velocity of the wind.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which:

FIG. 2 is a side elevational view demonstrating a "no wind" condition;

FIG. 3 is a side elevational view of the invention showing a "moderate" wind condition;

FIG. 4 is a side elevational view of the invention showing a "high" wind condition; and FIG. 5 is a top plan view of the invention demonstrating multiple wind directions.

DETAILED DESCRIPTION OF THE INVENTION

Figure 1:
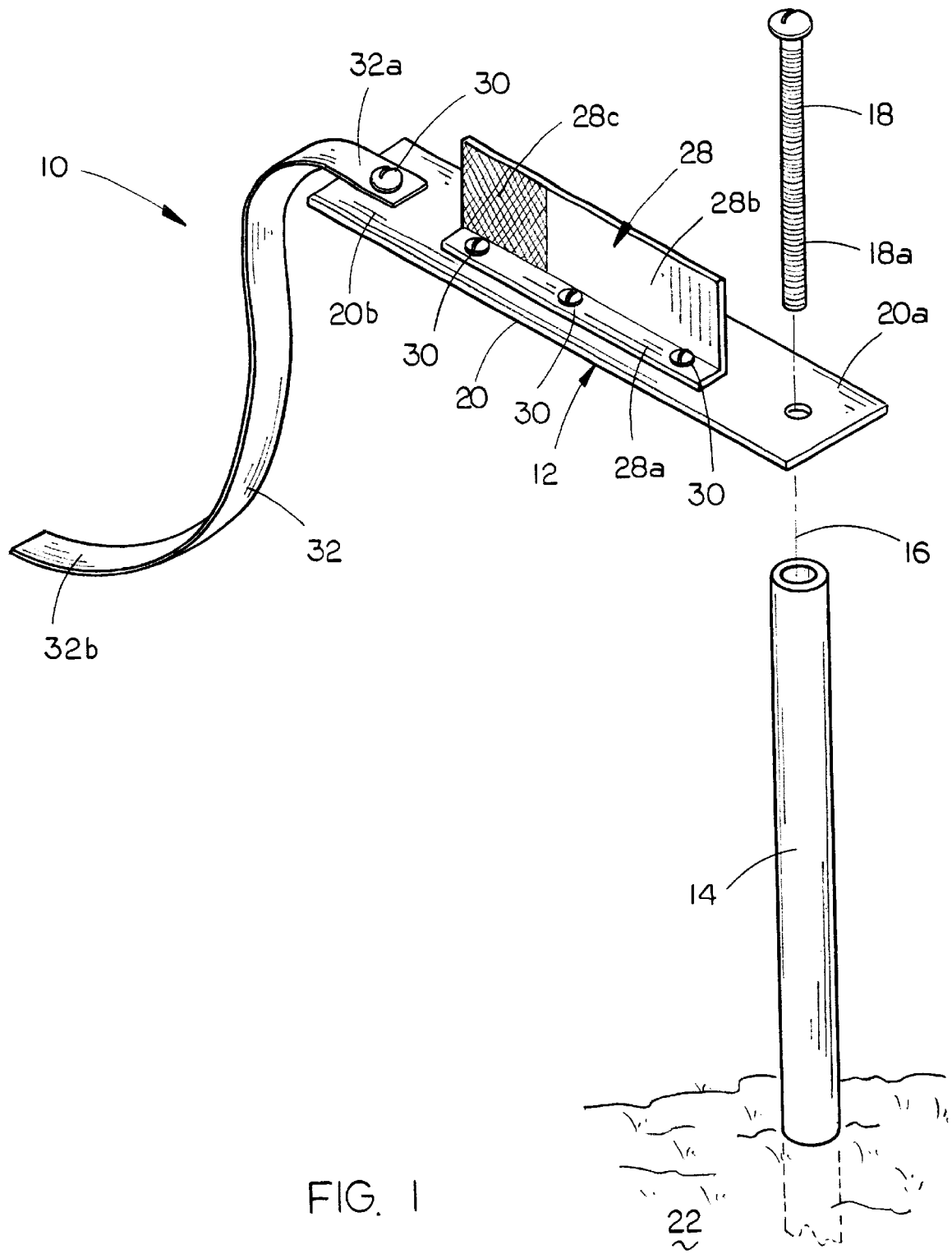
FIG. 1 is an exploded perspective view of the invention.

Referring now to the drawings, and more particularly to FIG. 1, the wind vane of the present invention is designated generally at 10 and includes a swing arm 12 pivotally connected to the upper end of a support post 14, for pivotal movement about a vertical swing axis 16. Swing arm 12 includes an elongated bolt 18 mounted through a forward end 20a of an elongated flat strap 20. Bolt shaft 18a of bolt 18 projects downwardly from strap 20 and forms the swing axis 16 of swing arm 12, as described in more detail hereinbelow.

Post 14 is hollow tubular member supported on the ground 22, either by burying the lower end of the post in the ground, as shown, or by supporting the post with legs (not shown) on the top of the ground 22. The inner diameter of post 14 is slightly larger than the outer diameter of bolt shaft 18a, so that bolt shaft 18a will rotatably slide within the interior of post 14.

A downwardly opening cap 24 is mounted on the lower face of strap 20 and centered along the swing axis 16. Bolt shaft 18a extends through the center of cap 24 and thence into post 14. Cap 24 includes a generally cylindrical side wall 26 which will extend below the upper end of post 14, to protect the interior of the post from snow, rain, and other environmental conditions.

An elongated fin 28 which is generally L-shaped in cross-section, is mounted on the upper face of strap 20 with the foot 28a of the L flush with the strap and the back 28b of the L projecting perpendicularly upwardly from strap 20. Fin back 28b is preferably centered along a longitudinal axis of strap 20, and aligned with the swing axis 16. A plurality of nut and bolt combinations 30 fasten fin foot 28a to strap 20 in a conventional fashion.

A rearward portion 28c of fin back 28b may be brightly colored or include reflective paint or tape to permit easy viewing. Fin back 28b has sufficient area that wind will contact the fin back 28b and cause swing arm 12 to pivot on bolt shaft 18a on swing axis 16, when the wind reaches a predetermined velocity.

An elongated, flexible fabric streamer 32 has a forward end 32a fastened to a rearward end 20b of strap 20, using a nut and bolt combination 30. Streamer 32 has a freely hanging rearward end 32b, which is utilized to determine wind speed, and wind direction, as discussed in more detail hereinbelow.

Referring now to FIGS. 2–4, it can be seen that the angular orientation of streamer 32 relative to strap 20 will effectively demonstrate the relative wind velocity. As shown in FIG. 2, if no wind is present, then streamer 32 will hang generally vertically from strap 20. In a moderate wind, strap 32 will hang at an angle from the vertical, as shown in FIG. 3. In a high wind, streamer 32 will extend rearwardly either horizontally or at a slight angle from the horizontal, as shown in FIG. 4.

Similarly, FIG. 5 shows the use of wind vane 10 to determine current wind direction and prior wind direction. Fin back 28b on strap 20 will catch the wind and orient strap 20 in the direction of the wind by swinging swing arm 12 on bolt 18. Because streamer 32 has more freedom of movement than swing arm 12, it is possible to determine the prior wind direction by viewing the orientation of the swing arm 12 relative to the orientation of streamer 32. The swing arm 12 will be positioned in the prior wind direction, before the wind overcomes the frictional engagement of the swing arm on the swing axis. The relative direction of streamer 32 will precede the movement of swing arm 12, thereby showing the current wind direction, while the swing arm retains the prior wind direction position before moving to the current wind direction.

The entire wind measurement apparatus 10 is constructed of rugged durable materials for a long life, and all nut and bolt combinations 30 are preferably double nutted, to ensure a secured connection which is not subject to loosening by vibration.

Whereas the invention has been shown and described in connection with the preferred embodiment thereof, many modifications, substitutions and additions may be made which are within the intended broad scope of the appended claims.

I claim:

1. A wind measurement apparatus, comprising:

an upright post with an upper end;

an elongated rigid swing arm having forward and rearward ends, the forward end pivotally connected to the post upper end for free pivotal movement on a vertical pivot axis;

said swing arm including a vertically-oriented fin thereon for catching wind and directing the swing arm on the pivot axis;

said swing arm extending horizontally from the pivot axis and including an elongated flat strap having upper and lower faces;

said fin extending perpendicularly from the upper face of the strap and longitudinally along a centerline of the strap; and an elongated flexible streamer having a first end attached to the swing arm rearward end indicating the current wind direction.

2. The wind measurement apparatus of claim 1, wherein said post is a tubular member with an open upper end, and further comprising:

an elongated bolt extending through the swing arm forward end and rotatably journaled in the tube upper end; and downwardly opening cap mounted on the swing arm forward end, through which said bolt is journaled, said cap having a generally cylindrical side wall having a lower edge with a diameter greater than that of the tube upper end such that, and said tube upper end removably journaled within the cap open end.

* * * * *